United States Patent
Abdul-Razzak et al.

(10) Patent No.: US 10,817,453 B2
(45) Date of Patent: Oct. 27, 2020

(54) INFORMATION HANDLING SYSTEM MULTIPLE PERIPHERAL CABLE MANAGEMENT

(71) Applicant: Dell Products L.P., Round Rock, TX (US)

(72) Inventors: Neda Abdul-Razzak, Pflugerville, TX (US); Mark David Menendez, Austin, TX (US); Derric Christopher Hobbs, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 46 days.

(21) Appl. No.: 16/127,489

(22) Filed: Sep. 11, 2018

(65) Prior Publication Data
US 2020/0081860 A1 Mar. 12, 2020

(51) Int. Cl.
*G06F 1/16* (2006.01)
*G06F 13/40* (2006.01)
*G06F 13/42* (2006.01)
*H01R 13/62* (2006.01)

(52) U.S. Cl.
CPC ........ *G06F 13/4068* (2013.01); *G06F 1/1632* (2013.01); *G06F 13/4282* (2013.01); *H01R 13/6205* (2013.01); *G06F 2213/0042* (2013.01)

(58) Field of Classification Search
CPC ...... G06F 1/1632; G06F 1/16; G06F 13/4068; G06F 13/4282; G06F 13/40; G06F 13/42; G06F 2213/0042; H01R 13/6205; H01R 13/60; H01R 13/62; H01R 31/06
USPC ........................................................ 174/68.1
See application file for complete search history.

(56) References Cited

U.S. PATENT DOCUMENTS

| 7,447,922 B1 * | 11/2008 | Asbury | G06F 1/266 |
| | | | 710/303 |
| 7,488,187 B2 | 2/2009 | Wolf | |
| 2018/0034191 A1 * | 2/2018 | Leigh | G02B 6/4292 |

FOREIGN PATENT DOCUMENTS

CN 201699280 1/2011

OTHER PUBLICATIONS

Club 3D_csv_3203-Docking Station_pp. 1-13_Feb. 2018.*
Dell TB18DC_pp. 1-34_May 2018.*
Latitude-e7240_e7474-ultrabook_setup-guide_pp. 1-8_Apr. 2013.*
NewEgg_TB18DC_pp. 1-2_Dec. 2017.*
Panduit_Harness Assembly & Bundling Prod Solutions_pp. 1-3_Aug. 2018.*

* cited by examiner

*Primary Examiner* — Timothy J Thompson
*Assistant Examiner* — Guillermo J Egoavil
(74) *Attorney, Agent, or Firm* — Zagorin Cave LLP; Robert W. Holland

(57) ABSTRACT

An information handling system interfaces with a docking station through a cable having first and second separate plug housings with first and second port connectors. An interconnecting structure formed in the first and second plug housings biases together with magnetic attraction to align the first and second port connectors in a predetermined manner adapted to insertion in adjacent ports of the information handling system. If the information handling system has only one port or has multiple non-adjacent ports, the plug housings separate to support insertion of a single connector into the information handling system.

18 Claims, 4 Drawing Sheets

INFORMATION HANDLING SYSTEM MULTIPLE PERIPHERAL CABLE MANAGEMENT

BACKGROUND OF THE INVENTION

Field of the Invention

The present invention relates in general to the field of information handling system peripheral cables, and more particularly to information handling system multiple peripheral cable management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interface with external devices through cables. One example of such cable interfaces is the Universal Serial Bus (USB) cable, which has recently upgraded to a USB 3.1 standard that includes a Type C connector. The Type C connector offers, among other things, reversible cable insertion, increased numbers of data lanes, increased power transfer and bi-directional power transfer. The increased number of data lanes allows a USB port to configure so that data lines are assigned to desired functions, such as by using two or four data lanes to transfer video information with the DisplayPort standard format while using other data lines to support USB formatted information. Power transfer supported at 100 W in many cases is sufficient to act as the primary external power interface. Advantageously, USB 3.1 with a Type C connector can support video, data and power needs of an information handling system all from one connector port. The use of one single port for multiple cable interfaces simplifies end user interactions and reduces costs.

In some instances, end users desire to interface multiple peripherals with an information handling system. For example, at a work location an end user might prefer to use a larger peripheral display and keyboard to interact with a portable information handling system than the smaller display and keyboard that typically integrates in the portable housing. One option available to an end user is to interface the multiple peripheral devices with a docking station and then interface the docking station to the portable information handling system with a USB cable. In many instances, a single USB 3.1 interface will support graphics, data and power transfer so that the information handling system can interface with the multiple peripheral devices through the docking station. In addition to supporting a peripheral display and keyboard, the docking station may include wired connections to a networking resource, such as a Cat V cable, or other resources. In some instances, graphics and data transfer rates through a single USB cable can result in congestion with reduced system performance. In addition, some more powerful information handling systems consume greater than the 100 W of power available through a single USB cable.

To meet advanced power and data needs, some docking stations support multiple USB cable interfaces with a single cable assembly that includes two USB Type C connectors. For example, the information handling system has two USB ports disposed next to each other at the housing so that a cable with two USB connectors disposed next to each other fits directly into the housing. Having two USB connectors interfaced with the docking station effectively doubles the power and data transfer capability of the docking station. The standard USB ports of the information handling system that support docking also support individual USB interfaces through USB cables that have a single connector, however, the dual USB port location is constrained to align with the dual connector docking cable. An end user will need a separate docking cable with one connector to dock with information handling systems that have only one port, that have dual ports located distal from each other, or that have dual ports with one of the ports occupied by a different cable connector.

SUMMARY OF THE INVENTION

Therefore, a need has arisen for a system and method which adapts a dual connector cable to multiple port configurations.

In accordance with the present invention, a system and method are provided which substantially reduce the disadvantages and problems associated with previous methods and systems that interface cable connectors to information handling systems. A docking station cable couples to a docking station at one end and an information handling system at an opposing end. An interconnecting structure biased together by magnetic attraction retains first and second plug housings in adjacent alignment to insert first and second cable connectors into adjacent separate first and second ports of the information handling system. If the information handling system has a single port configuration, the first and second plug housing separate from each other to support insertion of a single connector into the single port.

More specifically, a portable information handling system processes information with processing resources disposed in a portable housing having integrated input and output devices to interact with an end user. A docking station provides plural supporting resources for the portable information handling system, such as a peripheral keyboard, mouse and display, external power, and network communications. The docking station interfaces with the information handling system through a docking station cable having a docking station connector at one end and dual separable information handling system connectors at an opposing end, such as USB Type C connectors. Each information handling system connector is of the same type supported by the docking station, such as the USB Type C, and integrated in a plug housing having a circuit board to interface the connector with cable wirelines. The separable plug housings are formed to define an interconnecting structure biased together with magnetic attraction, such as an extension from one plug housing that inserts into an opening of the other plug housings so that, upon engagement of the interconnecting structure the connectors align to fit into adjacent information handling system ports. If the information handling system lacks adjacent ports configured to accept interconnected plug housings, the plug housings separate to permit single connector insertion into a single information handling system port.

The present invention provides a number of important technical advantages. One example of an important technical advantage is that an information handling system dual connector docking station cable adapts to support a single port information handling system with a separable coupling of the cable connectors so that one or both cable connectors selectively couple to an information handling system. The cable supports information handling systems with only one port, with dual ports located distal to each other, or with dual ports where one port is occupied by another cable or otherwise not useable. This allows an end user to leave the same docking cable coupled to the docking station while supporting information handling systems with different port configurations. Magnetic attachment of the cable connector ends to each other provides ready alignment of the ends for dual insertion or storage of one end in a position that does not interfere with single connector insertion into an information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A docking station cable supports information handling systems having dual and single port configurations with separable port connectors in separable plug housings. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
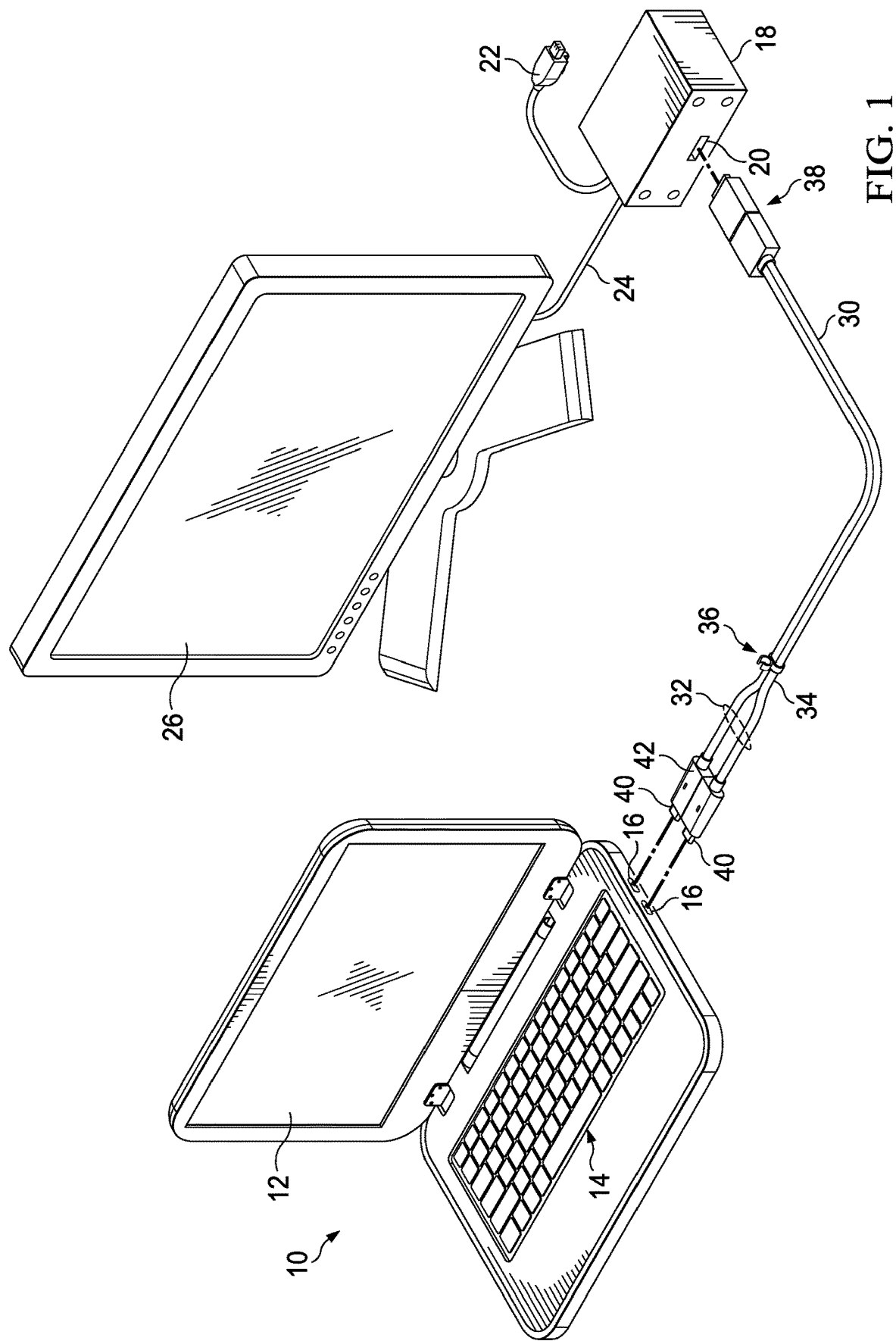
FIG. 1 depicts an information handling system and docking station interfaced through a docking station cable having dual separable connectors to support interfaces with information handling systems having both single and dual port configurations.

Referring now to FIG. 1, an information handling system 10 and docking station 18 interface through a docking station cable 30 having dual separable connectors 40 to support interfaces with information handling systems having both single and dual port 16 configurations. In the example embodiment, information handling system 10 has a portable housing that supports an integrated display 12 and keyboard 14. In a portable operating mode, an end user interacts with portable information handling system 10 with these integrated input/output (I/O) devices to use information handling system 10 without a physical connection for power or peripheral support. For instance, information handling system 10 processes information with instructions executed on a central processing unit (CPU) and stored in random access memory (RAM) powered by an integrated battery. Information handling system 10 includes first and second ports 16 adjacent to each other on a side of the housing that supports interfaces with peripheral devices. For example, ports 16 are both USB ports that support USB interfaces, such as ports configured to accept a USB Type C connector. Each port 16 may support a cable interface that communicates with a peripheral device, such as a display, a power source, a keyboard, a mouse, a storage device and/or a network interface device. In various embodiments, additional ports of a similar type may be located at other sides of information handling system 10, such as the rear. Further, other types of ports may be present to support other types of cable interfaces, such as power port configured to accept an external power source or a display port specific to graphics information, like DisplayPort or HDMI.

Docking station 18 offers a convenient work station tool that centralizes peripheral devices that an end user may want to use with portable information handling system 10. For example, docking station 18 has a single docking port 20 that an information handling system communicates with. Docking station 18 interfaces with peripheral devices through other ports and cables, such as a display cable 24 interfaced with a peripheral display 26, a networking cable 22 that interfaces with a networking resource, plus common work station peripherals like a keyboard and mouse. When an end user desires to use peripheral devices, the end user can perform one cable connection to docking station 18 to interact with its peripheral devices rather than individually interfacing with each of the peripheral devices. Docking station 18 consolidates the information associated with the peripheral devices and communicates the information with information handling system 10 through a single cable connection at port 20, such as a docking connector 38. In alternative embodiments, docking connector 38 may also have multiple connectors and ports similar to the configuration at information handling system 10 as explained in greater depth below.

In the example embodiment, docking cable 30 has a docking connector 38 at one end that couples to docking port 20 of docking station 18. In a typical use case, docking station 18 is deployed to a fixed location, such as an office cubicle or home office, with cable 30 coupled to port 20 and available for a portable information handling system 10 brought to the fixed location. Docking cable 30 has a combined single cable assembly extending from docking connector 38 to a cable split 34, where the cable splits into separate cable elements of a dual cable 32. Each cable element of dual cable 32 terminates at a separable plug housing 42, with each plug housing having a connector 40 extending out, such as a USB Type C connector. Connectors 40 are held in a predetermined alignment by plug housings 42 so that connectors 40 insert into ports 16 with a single insert motion of both plug housings 42 at the same time. Alternatively, the separate cable elements of dual cable 32 allow separation of plug housings 42 so that only one connector 40 may be selected for insertion into information handling system 10. For example, plug housings 42 are separated from each other and one element of dual cable 32 is folded back to couple with cable clip 36 so that it stays distal the other plug housing 42. The single connector 40 is then free to couple to a single port 16 without interference by the other connector 40. In one alternative embodiment, where multiple ports 16 are available in a non-adjacent configuration, such as at different sides of information handling system 10, plug housings 42 may be separated so that each connector 40 inserts into a port 16 in an independent manner. For instance, one connector 40 inserts into a port 16 on the side of information handling system 10 and the other inserts into a port at the rear of information handling system 10. Such a configuration may also be helpful to an end user who must fill an adjacent port 16 with a different device, such as a USB key.

Figure 2:
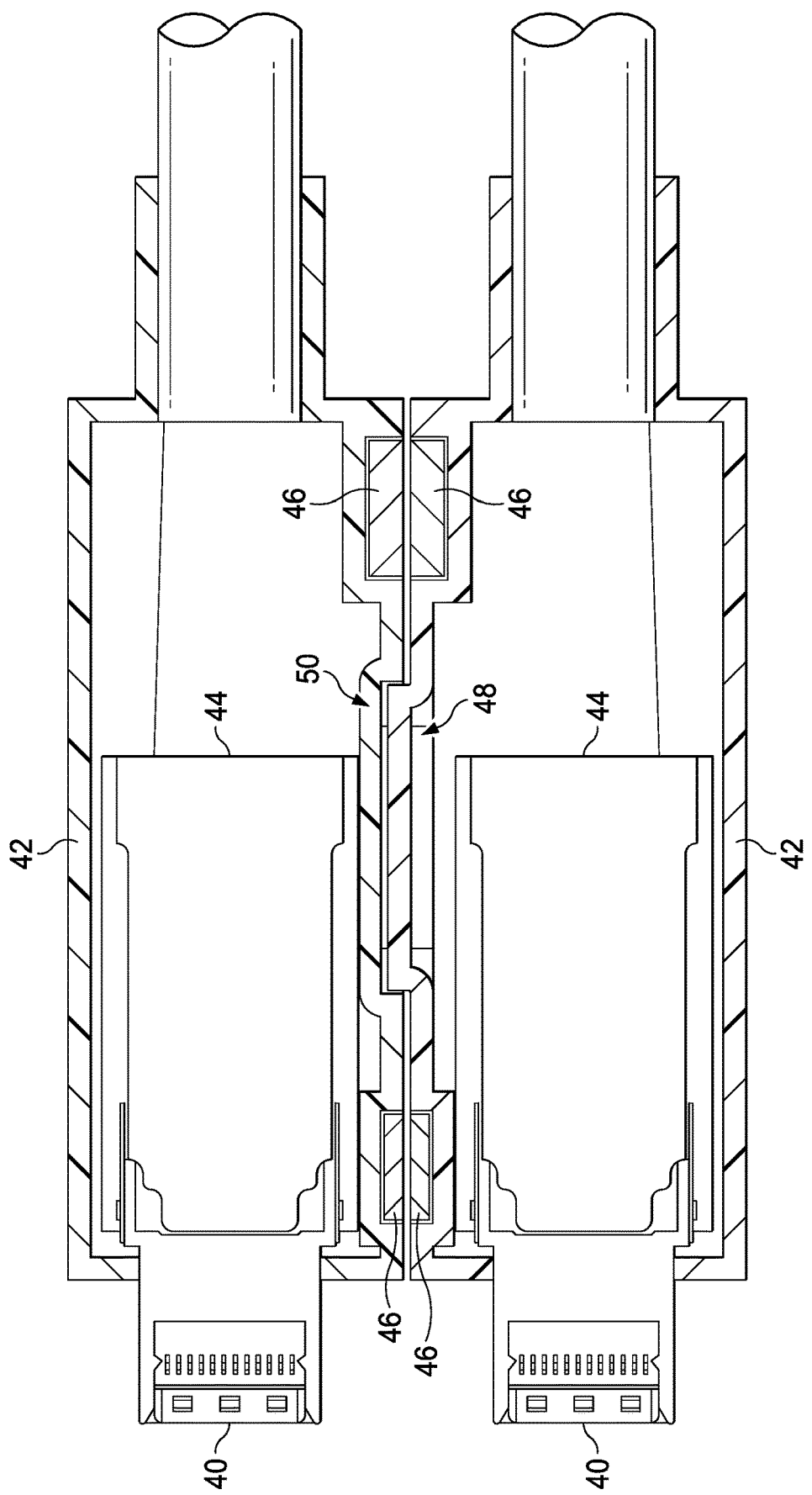
FIG. 2 depicts a top cutaway view of first and second plug housings aligned by an interconnecting structure to insert connectors into adjacent ports of an information handling system.

Referring now to FIG. 2, a top cutaway view depicts first and second plug housings 42 aligned by an interconnecting structure to insert connectors 40 into adjacent ports 16 of an information handling system 10. Each plug housing 42 contains a printed circuit board 44 that interconnects wirelines of docking cable 30 with connectors 40, such as in accordance with the USB 3.1 standard. The interconnecting structure is an extension 48 that inserts into an opening 50 formed in opposing sides of plug housings 42. Extension 48 fits snuggly into opening 50 so that on full insertion plug housings 42 hold connectors 40 in alignment to fit into adjacent ports 16. Extension 48 is biased into opening 50 with magnetic attraction provided by magnets 46 or other ferromagnetic material. For example, magnets 46 may align with opposing polarities to provide magnetic attraction or magnets may align opposite iron or steel plugs. In the example embodiment, printed circuit boards 44 are independent and not electrically interfaced at plug housings 42. In alternative embodiments, various interfaces or sensors may be included so that an indication may be communication to docking station 18 that plug housings 42 are aligned or not aligned. For instance, magnets 46 may touch to share a ground so that docking station 18 can test the common ground to determine proximity of plug housings 42 to each other. As another example, a printed circuit board 44 may include a Hall sensor that senses the proximity of a magnet 46 in an opposing plug housing 42 and reports proximity to docking station 18. In other embodiments, other types of switches may be used.

Figure 3:
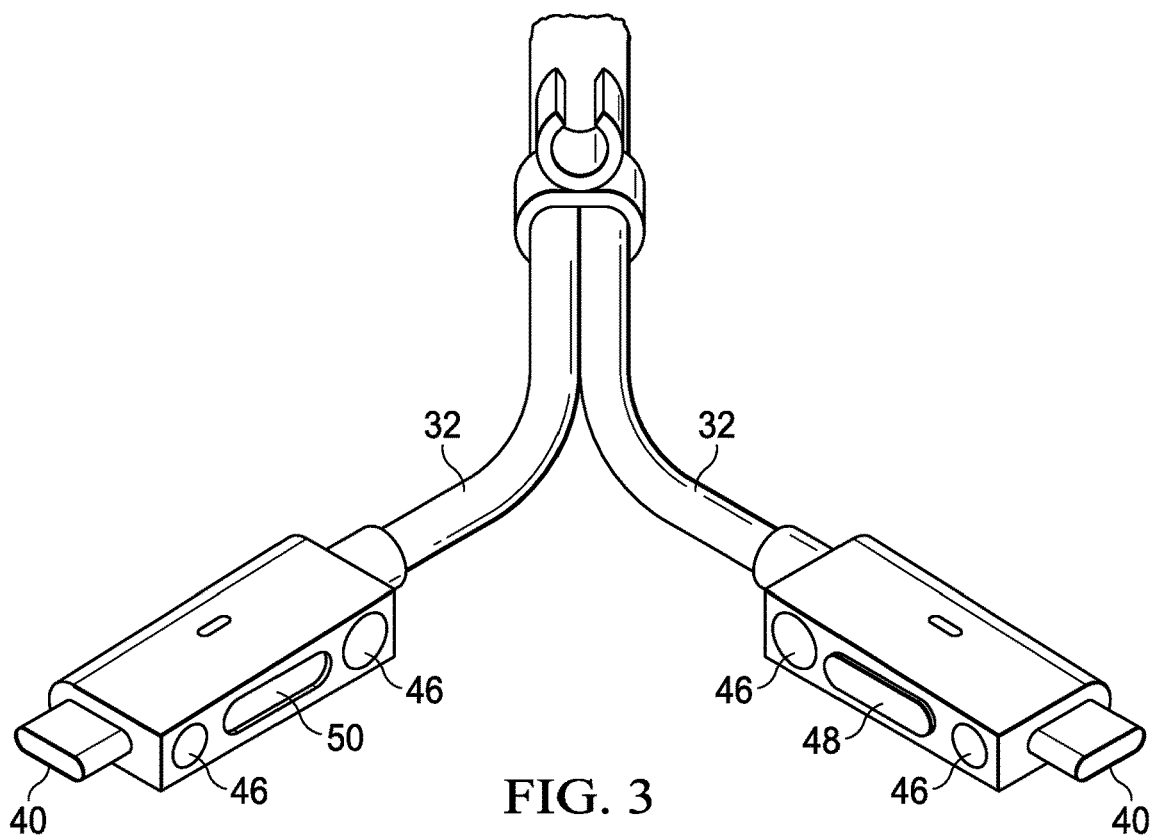
FIG. 3 depicts first and second plug housings separated from each other to illustrate an example of an interconnecting structure.

Referring now to FIG. 3, first and second plug housings 42 are depicted separated from each other to illustrate an example of an interconnecting structure. Extension 48 is sized to fit into opening 50 so that connectors 40 achieve a desired alignment. Magnets 46 provide a biasing force to pull extension 48 into opening 50. In various embodiments, the alignment of connectors 40 may be adjusted by changing the relationship of the interconnecting structure, such as inserting a secondary object between extension 48 and opening 50 to change the alignment of connectors 40. Such additional structures allow docking cable 30 to adapt to different configurations of adjacent ports at an information handling system.

Figure 4:
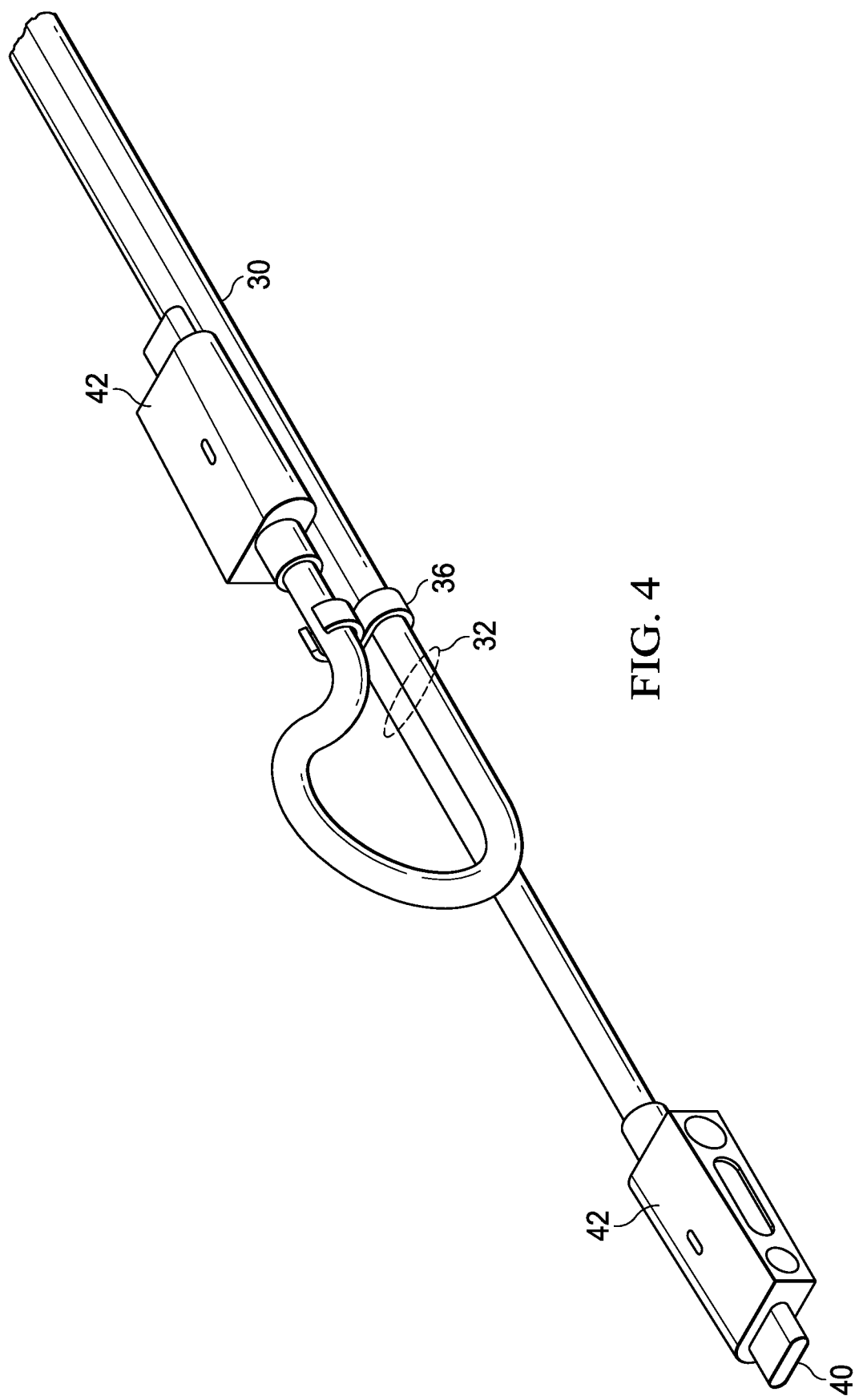
FIG. 4 depicts a docking station cable having one plug housing retained distal the other to support a single connector interface.

Referring now to FIG. 4, a docking station cable is depicted having one plug housing 42 retained distal the other to support a single connector 40 interface. In the example embodiment, a clip 36 holds one cable element of dual cable 32 so that plug housing 42 is retained along docking cable 30 between docking station 18 and clip 36. In an alternative embodiment, a magnet within plug housing 42 may be used to hold it in position, such as against a ferromagnetic material integrated with singe combined cable element 30. In addition, a sensor may be included that detects the magnet so that a signal may be sent to docking station 18 to indicate a single connector configuration is set up.

Figure 5:
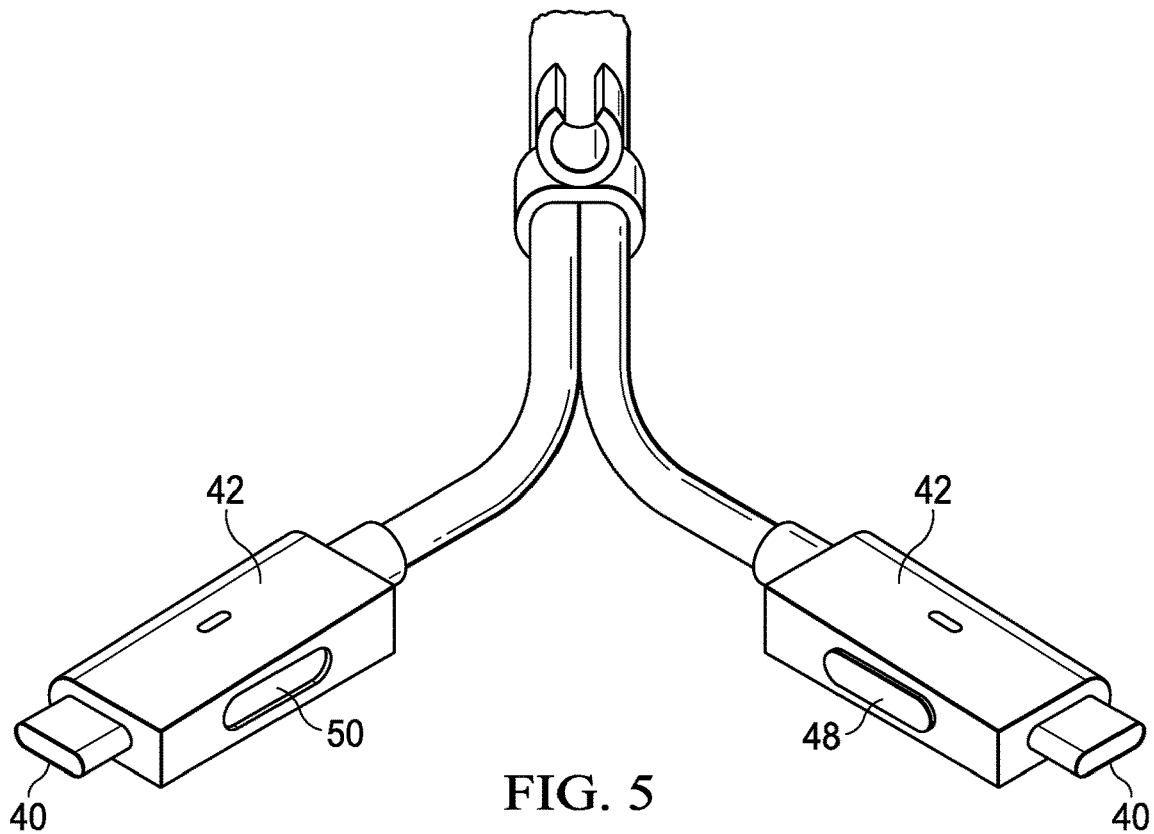
FIG. 5 depicts an alternative embodiment of an interconnecting structure formed in first and second plug housings.

Referring now to FIG. 5, an alternative embodiment depicts an interconnecting structure formed in first and second plug housings 42. Extension 48 and opening 50 integrate ferromagnetic material that bias plug housings 42 together. For instance, one plug housing integrates a magnet while the other has a steel outer shell. In various embodiments, other types of alignment structures may be used, such as vertically stacking plug housings 42 or rotating one or both of plug housings 42 so that different alignments of connectors 40 become possible. Different arrangements of plug housings 42 may be driven by structural definitions that interact and arrangements of magnet polarities. The reversible nature of Type C connectors supports interfaces with different orientations.

Although the present invention has been described in detail, it should be understood that various changes, substitutions and alterations can be made hereto without departing from the spirit and scope of the invention as defined by the appended claims.

What is claimed is:
1. An information handling system comprising:
    a portable housing having plural ports, each of the plural ports communicating information and power with an external connector that inserts into the port;
    a docking station having plural resources; and
    a cable coupled to the docking station at a first end and the plural ports at a second end, the second end having first and second plug housings, each plug housing having a connector configured to fit in one of the plural ports, the plug housings separable from each other and including an interconnecting structure that removeably couples the plug housings with the connectors aligned for simultaneous insertion into the plural ports; and
    a sensor disposed in at least one of the plug housings to sense if the first and second plug housings are aligned in proximity to each other for communication to the docking station.
2. The information handling system of claim 1 wherein the cable interconnecting structure further comprises:
    a first side of the first plug housing formed as an extension; and
    a first side of the second plug housing formed as an indentation, the extension fitting into the indentation to align the connectors.

3. The information handling system of claim 2 wherein the cable interconnecting structure further comprises:
a magnet integrated in one of the extension or indentation; and
ferromagnetic material integrated in the other of the extension or indentation; the magnet and ferromagnetic material attracting to bias the extension into the indentation.

4. The information handling system of claim 2 wherein the cable interconnecting structure further comprises:
a magnet integrated in one of the first or second plug housings; and
a ferromagnetic material integrated in the other of the first or second plug housings, the magnet and ferromagnetic material interacting to bias the extension into the indentation.

5. The information handling system of claim 4 wherein the ferromagnetic material is a magnet.

6. The information handling system of claim 1 wherein the cable interconnecting structure comprises first and second magnets in each of the plug housings integrated to have opposing polarities that bias the connectors into alignment.

7. The information handling system of claim 1 further comprising a clip disposed on the cable that removeably holds one of the plug housings away from the other plug housing.

8. The information handling system of claim 7 wherein the clip comprises a clip that couples to the cable proximate the plug housing.

9. A method for interfacing an information handling system and a docking station, the method comprising:
coupling a cable at a first end to the docking station;
if the information handling system has plural ports, then coupling first and second connectors of the cable to first and second ports of the information handling system, the first and second connectors in first and second plug housings;
if the information handling system has only one port, then separating the first and second plug housings to insert one of the first and second connectors of the cable into the one port;
sensing a proximity of the first and second plug housings to each other; and
communicating the proximity to the docking station.

10. The method of claim 9 wherein the separating the first and second plug housings further comprises:
pulling the first and second plug housings away from each other to overcome a magnetic bias of the first and second plug housings towards each other; and
securing the other of the first or second plug housings to the cable.

11. The method of claim 10 wherein securing further comprises coupling the other of the first or second plug housings to a clip on the cable.

12. The method of claim 9 wherein the sensing further comprises:
integrating a magnet in one of the first or second plug housings; and
sensing the magnet with a Hall sensor integrated in the other of the first or second plug housings.

13. The method of claim 9 wherein sensing further comprises sharing a ground between the first and second plug housings when in proximity to each other.

14. The method of claim 9 wherein:
the information handling system has first and second ports, the first port at a first side of the information handling system, the second port at a second side of the information handling system; and
the coupling first and second connectors further comprises separating the first and second plug housings to insert the first and second connectors into the first and second ports.

15. The method of claim 9 wherein the first and second connectors are USB Type C connectors.

16. A docking station cable comprising:
a docking connector configured to couple to a docking station;
a cable coupled to the docking connector at a first end, the cable extending from the docking connector as a single cable element to a cable split, the cable extending from the cable split as first and second separate cable elements;
a first plug housing coupled to the first separate cable element, the first plug housing integrating a connector configured to insert in a first port and a magnet;
a second plug housing coupled to the second separate cable element, the second plug housing integrating a connector configure to insert in a second port and a ferromagnetic material that attracts to the magnet to align the first and second connectors in a predetermined manner; and
a sensor disposed in at least one of the first and second plug housings to sense if the first and second plug housings are aligned in proximity to each other for communication to the docking station.

17. The docking cable of claim 16 further comprising:
an interconnecting structure formed in opposing sides of the first and second plug housings, the interconnecting structure engaging when biased into contact by the magnet and ferromagnetic material to align the first and second connectors.

18. The docking cable of claim 17 further comprising a cable clip disposed at the cable split and configured to couple one of the first or second separate cable elements to maintain the first and second plug housings separate from each other.

* * * * *